United States Patent Office 3,484,437
Patented Dec. 16, 1969

3,484,437
DERIVATIVES OF 7 - AMINO - CEPHALO-
SPORANIC ACID AND PROCESS FOR
THEIR MANUFACTURE
Jakob Urech, Basel, Bruno Fechtig, Binningen, Rolf Bosshardt, Basel, Hans Bickel, Binningen, Karl Schenker, Basel, and Max Wilhelm, Allschwil, Switzerland, assignors to Ciba Corporation, New York, N.Y., a corporation of Delaware
No Drawing. Filed Oct. 6, 1964, Ser. No. 401,972
Claims priority, application Switzerland, Oct. 7, 1963, 12,305/63; Nov. 8, 1963, 13,765/63; June 12, 1964, 7,670/64
Int. Cl. C07d 99/24; A61k 27/00
U.S. Cl. 260—243
16 Claims

ABSTRACT OF THE DISCLOSURE

Derivatives of cephalosporanic acid of the Formula I

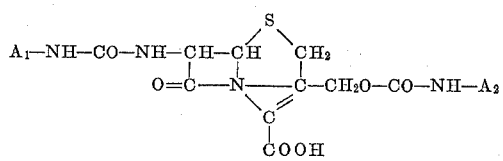

in which $A_1$ and $A_2$ each represents an unsubstituted or substituted, linear or branched aliphatic hydrocarbon radical with up to 6 carbon atoms, and their salts, as well as a special process for their manufacture. Aliphatic hydrocarbon radicals are more especially lower alkyl radicals, such as methyl, ethyl, propyl, isopropyl, also lower alkenyl, for example, vinyl or allyl. $A_1$ and $A_2$ may be identical or different from each other. The compounds display an antibacterial action against Gram-positive bacteria, for example, *Bacillus substilis*, *Bacterium megatherium* and *Staphylococcus aureus*, and especially also against penicillin-resistant strains, and above all against Gram-negative bacteria, for example, *Escherichia coli*, *Klebsiella pneumoniae*, and *Salmonella typhosa* and *typhimurium*.

The present invention provides new, therapeutically active derivatives of cephalosporanic acid of the Formula I

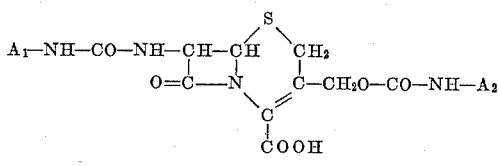

in which $A_1$ and $A_2$ each represents an unsubstituted or substituted, linear or branched aliphatic hydrocarbon radical with up to 6 carbon atoms, and their salts as well as a special process for their manufacture. Aliphatic hydrocarbon radicals are more especially lower alkyl radicals, such as methyl, ethyl, propyl, isopropyl, also lower alkenyl, for example vinyl or allyl.

$A_1$ and $A_2$ may be identical or different from each other.

Examples of substituents are, more particularly, halogen atoms, such as bromine, fluorine, iodine, and especially chlorine, also lower alkoxy, such as methoxy or ethoxy groups. The halogen atoms are preferably in the β-position to the carbamyl group; $A_1$ or $A_2$ is, for example, a 2-halogenoethyl, 2-halogenopropyl or 1-methyl-2-halogenopropyl group. There may also be several substituents in $A_1$ and $A_2$ or only one of $A_1$ and $A_2$ may be substituted.

The salts of the new compounds are metal salts, above all salts with therapeutically acceptable metals of the groups of alkali and alkaline earth metals, such as sodium, potassium, ammonium or calcium, or salts with organic bases, for example triethylamine, N-ethylpiperidine, dibenzylethylenediamine or procaine and others, such as are used for preparing salts of penicillins.

The new compounds display an antibacterial action against Gram-positive bacteria, for example *Bacillus substilis*, *Bacterium megatherium* and *Staphylococcus aureus*, and especially also against penicillin-resistant strains, and above all against Gram-negative bacteria, for example *Escherichia coli*, *Klebsiella pneumoniae*, and *Salmonella typhosa* and *typhimurium*. They may, therefore, be used for combating diseases caused by Gram-positive or Gram-negative bacteria or as disinfectants or also as additives to animal fodder or for preserving victuals.

Of special value are O-desacetyl-O-(β-chloroethylcarbamyl)-7-[N'-(β-chloroethyl) - ureido] - cephalosporanic acid and its salts.

The new compounds are obtained by reacting a desacetyl-7-amino-cephalosporanic acid of Formula II

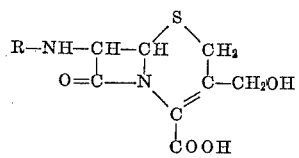

in which R represents a hydrogen atom or the group CO—NH—$A_1$, with an isocyanic acid ester of the Formula III $$A_2—N=C=O \qquad III$$

and, if desired, converting a resulting compound into a salt thereof.

It is surprising that the above process can be carried out with good yields. Hitherto desacetyl-7-aminocephalosporanic acid could be acylated at the hydroxyl group either with only a poor yield or not at all. When the conventional acylation methods are used, for example with an acid chloride or acid anhydride, the lactone is formed and in addition thereto substances with an open lactam ring, and only little or no acyl derivative. It was unexpected that the reaction with an ester of isocyanic acid would yield an O-acyl derivative smoothly and in good yield.

The reaction of the desacetyl compound with the isocyanic acid ester is preferably carried out in the presence of a strong organic nitrogen base, for example a tri-lower alkaylamine such as triethylamine or tributylamine, in an inert solvent, for example in dimethylformamide, methylene chloride, tetrahydrofuran or acetonitrile. If the starting compound contains as such a substituent $A_1$, the group $A_2$ of the isocyanic acid ester used for the reaction may be identical with or different from the group $A_1$.

It is also possible to esterify the carboxyl group at any stage of the process with an alcohol that is readily hydrolysable in an acid medium, preferably benzhydryl alcohol and to eliminate it at a later stage. The temporary conversion of the acid into the ester is very suitable for purifying the final products.

The desacetyl-7-amino-cephalosporanic acids of Formula II used as starting materials are obtained by desacetylation of the corresponding 7-amino-cephalosporanic acids, for example with acetyl esterase. The known method for the manufacture of desacetyl-7-aminocephalosoporanic acid can be considerably improved by acidifying the solution to pH 4.5 after completion of the enzymatic reaction; the acid precipitates then from the solution and can be separated.

The new compounds can be used as medicaments, for example in the form of pharmaceutical preparations which contain them in admixture or conjunction with an organic or inorganic, solid or liquid pharmaceutical excipient suitable for enteral, parenteral or local administration. Suitable excipients are substances that do not react with the new compounds, for example water, gelatine, lactose, starches, stearyl alcohol, magnesium stearate, talcum, vegetable oils, benzyl alcohols, gums, propyleneglycol, polyalkyleneglycols, white petroleum jelly, cholesterol or other known medicinal excipients. The pharmaceutical preparations may be, for example, tablets, dragees, ointments, creams or capsules, or in liquid form solutions, suspensions or emulsions. They may be sterilized and/or contain assistants, such as preserving, stabilizing, wetting or emulsifying agents, solution promoters, salts for regulating the osmotic pressure or buffers. They may also contain further therapeutically valuable substances. The preparations are formulated by the conventional methods.

The following examples illustrate the invention without, however, in any way restricting its scope.

The thin-layer chromatographic examinations on silica gel are carried out with the use of the following systems:

System I: n-butanol+acetic acid (10:1), saturated with water
System II: ethyl acetate+pyridine+acetic acid+water (60:20:6:11)
System III: n-butanol+pyradine+acetic acid+water (30:20:6:24).

EXAMPLE 1

1.125 g. (4.9 millimols) of desacetyl-7-aminocephalosporanic acid are partially dissolved in a mixture of 90 ml. of absolute dimethylformamide and 1.365 ml. of absolute triethylamine and mixed with 1.552 g. (1.23 ml.) of β-chloroethylisocyanate (14.7 millimols). When the whole has been agitated for ½ hour at 25° C., all has passed into solution. The solution is kept for 23 hours at 25° C. in the dark, and then evaporated under vacuum at a bath temperature of 30° C. The oily residue is distributed between chloroform+ether (1:3) and normal sodium bicarbonate solution. The organic phase is further extracted with two fresh portions of normal sodium bicarbonate solution. The aqueous extracts are adjusted to pH 2 with 85% phosphoric acid and repeatedly extracted with ethyl acetate. The extracts are dried over sodium sulfate and evaporated under vacuum, to yield 1.805 g. of crude O-desacetyl-O-(β-chloroethyl-carbamyl)-7-(β-chloroethyl-ureido)-cephalosporanic acid of the formula

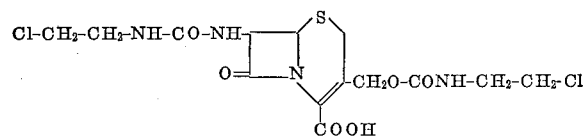

For purification the residue is dissolved in 600 ml. of ethyl acetate, agitated for 10 minutes with 1.8 g. of adsorptive carbon, filtered through a thin layer of 5.4 g. of Celite and rinsed with ethyl acetate. The first 900 ml. of filtrate contain 1.539 g. of the purified product which reveals in the thin-layer chromatogram the following $Rf$-values: System I—$Rf$=0.41; system II—$Rf$=0.37; system III—$Rf$=0.67 (colorless stains on a violet background after spraying with iodine starch acetic acid reagent).

The crude O-desacetyl-O-(β-chlorethyl-carbamoyl)-7-(β-chlorethylureido)-cephalosporanic acid can be obtained in crystallized form from hot acetone or from a small amount of cold methanol with much acetone, with subsequent concentration of the solution under reduced pressure. The acid thus obtained, after it has been dried at room temperature over phosphorus pentoxide in a high vacuum, is a molecular crystal compound containing one mol of acetone. The crystals decompose at a temperature above 130° C. without melting; on rapid heating, the compound melts at 156° C. The U.V. spectrum in ethanol shows a maximum at 263μ

$(E_{1\,cm.}^{1\%}=171, \epsilon=7550)$

The I.R. spectrum in Nupol (heavyl paraffin oil) shows bands at 3.01; 5.63; 5.70; 5.77; 5.92; 6.14; 6.30; 6.50; 7.49; 7.64; 7.97; 8.50; 8.73; 9.10; 9.32μ.

$[\alpha]_D^{20}=+47°\pm2°$

To obtain the sodium salt, 71.3 g. (143 mmol) of the crystalline compound containing 1 mol of acetone are suspended in 320 ml. of acetone and 10 ml. of water, then titrated to pH 7.0 with 270.1 ml. of 0.5 N sodium hydroxide solution. The solution is immediately filtered through Celite and lyophilized. The resulting sodium salt of O-desacetyl-O-(β-chlorethyl-carbamoyl)-7-(β - chlorethylureido)-cephalosporanic acid readily dissolves in water. It decomposes from 130° C. upwards. The U.V. spectrum in water shows a maximum at 261μ.

$(E_{1\,cm.}^{1\%}=172, \epsilon=7950). [\alpha]_D^{20}=+70°\pm1°$

The O-desacetyl-O-(β-chloroethyl-carbamyl)-7-(β-chloroethyl-ureido)-cephalosporanic acid may also be purified by converting it into the crystalline benzhydryl ester and then hydrolysing the latter:

A filtered solution of 2.3 g. (11.9 millimols) of diphenyldiazomethane in 15 ml. of petroleum ether is slowly stirred into a solution of 4.02 g. (9.1 millimols) of O-desacetyl-O-(β-chloroethyl-carbamyl)-7-(β - chloroethyl-ureido)-cephalosporanic acid in 60 ml. of dioxan. 0.2 ml. of methanol and then 20 minutes later 0.6 ml. of methanol are added; the whole is left to itself for a total of 4 hours and then evaporated under vacuum. The residue is taken up in ethyl acetate and washed with 2 N-hydrochloric acid, N-sodiumbicarbonate solution and wate. The organic phase is dried over sodium sulfate and evaporated; the residue (5.98 g.) is chromatographed on 40 times its own weight of silica gel (Davidson No. 922, containing 2% of water). The fractions eluted with a 95:5-mixture of methylene chloride and acetone yield 2.85 g. of O-desacetyl-O-(β-chloroethylcarbamyl)-7-(β-chloroethyl-ureido) - cephalosporanic acid benzhydryl ester which crystallizes from aqueous methanol to form a colorless powder melting at 175 to 176° C. with decomposition.

The infrared absorption spectrum in Nujol (liquid petrolatum) contains bands at 3.02, 5.65, 5.78, 5.91, 6.10, 6.41, 6.49, 7.10, 7.51, 7.66, 7.89, 817, 8.29, 8.61, 8.72, 9.11, 9.33 and 14.16μ.

3.09 g. (5.1 millimol) of O-desacetyl-O-(β-chloroethyl-carbamyl)-7-(β-chloroethyl-ureido)-cephalosporanic acid benzhydryl ester are dissolved in 4 ml. of anisole and 20 ml. of trifluoroacetic acid and after 4 minutes evaporated under 0.1 mm. Hg pressure. The residue is taken up in benzene+ethyl acetate (5:2) and agitated with 10% aqueous dibasic potassium phosphate. The product is extracted from the aqueous phase with ethyl acetate at pH 2.0. When dried over sodium sulphate and evaporated, the extract yields 2.03 g. (=90% of the theoretical yield) of O-desacetyl-O-(β-chloroethyl-carbamyl)-7-(β - chloroethyl-ureido)-cephalosporanic acid. According to its thin-layer chromatogram (silica gel; system n-butanol+glacial acetic acid 10:1, saturated with water) the product is unitary; $Rf$ value 0.45. The infrared absorption spectrum in Nujol displays in the carbonyl region bands at 5.63, 5.81, 5.91 and 6.13μ.

The potassium salt is prepared as follows:

A solution of 1.425 g. of the free acid in 30 ml. of acetone is mixed with a 10% excess of a 50% acetonic solution of potassium-α-ethylhexanoate, the solution is evaporated under vacuum to half its volume and the concentrate is diluted with 4 parts by volume of ether, whereupon the potassium salt settles out as a light-grey powder.

The compound is active in vitro and in vivo for instance against *Staph. aureus* Smith (penicillin G-sensitive), *Staph. aureus* penicillin G-resistant, *Escherichia coli*, *Salmonella typhosa*, *Klebsiella pneumoniae*.

The desacetyl-7-amino-cephalosporanic acid used as starting material may be prepared as follows:

273 mg. (1millimol) of 7-amino-cephalosporanic acid are suspended in 9 ml. of distilled water and while being vigorously stirred 0.2 N-potassium hydroxide solution is added drop by drop until a pH value of 6.7 has been established, during which everything passes into solution. 4 ml. of an aqueous solution of acetyl esterase stabilized with sodium oxalate are then added. The liberated acetic acid is neutralized with the use of an automatic titrator with 0.2 N-potassium hydroxide solution (adjustment to pH=6.7). After 9 hours 81% of the theoretical amount of potassium hydroxide solution have been consumed. A further 2 ml. of acetyl esterase solution are then added, but within the following 14 hours only another 4% of potassium hydroxide solution are consumed. The yellow, slightly turbid reaction solution is filtered through Celite. Desacetyl-7-amino-cephalosporanic acid is precipitated by acidifying the clear filtrate with 2 N-acetic acid to pH=4.5. Yield: 161 mg.

Infrared spectrum in Nujol: bands, inter alia, at 2.96, 3.15 and 5.56μ. There is definitely no longer an ester band visible. The thin-layer chromatogram of the product on silica gel in the system n-butanol+pyridine+acetic acid+water (30:20:6:24) reveals an Rf-value of 0.33 (7-aminocephalosporanic acid in the identical system: Rf 0.40). Flesh-colored stains on spraying with ninhydrin+collidine; colorless stains on a violet background after spraying with iodine starch acetic acid reagent (by the method of R. Thomas, Nature, 191, p. 1161 [1961]).

The electrophoretic behaviour of desacetyl-7-amino-cephalosporanic acid (I) compared with 7-amino-cephalosporanic acid (II) (each electrophorized for 90 minutes at 46 volt/cm. on Whatman paper No. 1; the figures indicate the distance travelled towards the anode in cm.):

|  | I | II |
| --- | --- | --- |
| Phosphate buffer according to Soerensen, pH 7.0 | 15.2 | 13.4 |
| Acetic acid plus pyridine buffer, pH 4.5 | 4.5 | 3.3 |

The acetyl esterase is prepared as follows:

From 10 kg. of oranges having as thick a peel as possible the flavedo (outermost orange-colored layer of the peel) is removed with a Bircher grater. The 1600 g. of flavedo thus obtained are homogenised in 8 portions of 200 g. each with 200 ml. of ice-cold 3% sodium chloride solution each. The resulting paste of each portion is immediately mixed with 20 g. of Celite and suctioned through a nylon filter. To stabilize the esterase the ice-cooled combined filtrates are saturated with 52 g. of sodium oxalate, filtered through a thin layer of Hyflo Supercel, and the filtrate is mixed with 742 g. of ammonium sulfate (=70% of the amount required for saturation). The whole is kept overnight at 0° C. and the precipitate formed is then suctioned off. The precipitate, which contains the enzyme, is taken up in 200 ml. of 0.1-molar sodium oxalate solution and dialysed for 10 days at 0° C. against a 0.1-molar sodium oxalate solution, the outer solution being renewed every day. The enzyme solution is finally filtered and stored at 0° C.

EXAMPLE 2

In an analogous manner to that described in Example 1, desacetyl - 7 - (β-chloroethylureido)-cephalo-sporanic acid of the formula

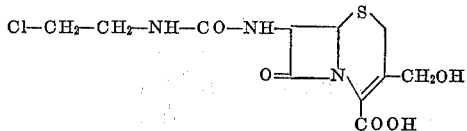

may be reacted in dimethylformamide with β-chloroethyl isocyanate and triethylamine to form O-desacetyl-O-(β-chloroethylcarbamoyl) - 7 - (β-chloroethylureido)-cephalosporanic acid.

The starting material may be prepared as follows:

544 mg. (2 millimols) of 7-amino-cephalosporanic acid are boiled in 10 ml. of methylene chloride and 0.56 ml. of triethylamine with 222 mg. (2.1 millimols) of β-chloroethylisocyanate for 8 hours under a moderate reflux. The whole is evaporated and the residue taken up in 50 ml. of chloroform and 50 ml. of ethyl acetate and agitated with 3 ml. of 2 N-hydrochloric acid and 20 ml. of water. The chloroform+ethyl acetate solution is then once more agitated with 10 ml. of water, dried over sodium sulfate and cautiously evaporated. Recrystallization of the residue from acetone+acetic acid+petroleum ether furnishes 7-(β-chloroethyl-ureido)-cephalosoporanic acid in the form of substantially colorless crystals melting at 165° C. with decomposition.

The sodium salt, which is prepared with sodium ethylhexanoate in acetone, changes color at 170° C. and decomposes above 200° C.

A solution of 4.0 mg. (0.01 millimol) of the sodium salt of 7-(β-chloroethylureido)-cephalosporanic acid in 0.8 ml. of distilled water is adjusted to pH=6.7 with 0.02 N sodium hydroxide solution. 0.2 ml. of acetyl esterase solution is then added and the acetic acid liberated during the desacetylation is neutralized with the aid of an automatic titrator with 0.02 N sodium hydroxide solution to pH=6.7. After 135 minutes, 80% of the theoretical amount of sodium hydroxide solution have been consumed. The resulting desacetyl-7-(β-chloroethyluredio)-cephalosporanic acid shows the following Rf values in the thin-layer chromatogram on silica gel (developed with iodine starch+acetic acid reagent): System I: 0.33; System II: 0.24; System III: 0.64.

EXAMPLE 3

In an analogous manner to that described in Examples 1 and 2, O-desacetyl-O-(γ-chloropropylcarbamoyl)-7-(γ-chloropropylureido)-cephalosporanic acid is obtained.

The desacetyl-7-(γ-chloropropylureido) - cephalosporanic acid (M.P. 160° C. with decomposition) used as starting material may be prepared by reacting 7-amino-cephalosporanic acid with γ-chloropropyl-isocyanate and by enzymatic desacetylation according to the method described in Example 2. The compound reveals in the thin-layer chromatogram on silica gel the following Rf values; System I: Rf=0.37; System II: Rf=0.24; System III: Rf=0.61.

EXAMPLE 4

O-desacetyl-O-(1' - methyl-2'-chloropropylcarbamoyl)-7-(1''-methyl - 2'' - chloropropylureido)-cephalosporanic acid is prepared in a manner analogous to that described in Examples 1 and 2.

The desacetyl - 7 - (1'-methyl-2'-chloropropylureido)-cephalosporanic acid used as starting material may be obtained as described in Example 2. Behaviour in the thin-layer chromatogram (silica gel, iodine starch+acetic acid reagent): System I: Rf=0.44; System II: Rf=0.34; System III: Rf=0.63.

EXAMPLE 5

In the same way as described in Example 2, from desacetyl - 7 - (chloro - tertiary butylureido) - cephalosporanic acid of the formula

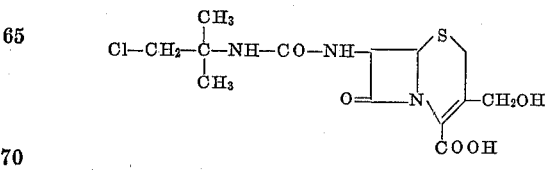

there is obtained O-desacetyl-O-(chloro-tertiary butylcarbamoyl) - 7 - (chloro-tertiary butylureido) - cephalosporanic acid. The compound decomposes above 140° C. without melting. Optical rotation: $[\alpha]_D^{23} = +73° \pm 1$ (c.=1 in 0.5 N KHOC₃); infrared spectrum in Nujol: bands at 2.97; 3.45; 5.65; 5.80; 5.90; 6.09; 6.40; 6.45; 6.58; 6.85; 7.26; 7.32; 7.50; 7.80; 7.95; 8.20; 8.55; 8.72; 8.84; 9.18; 942; 9.75; 10.20; 10.65; 12.43; 12.85; 13.58; 14.00μ.

Ultraviolet maximum in rectified spirit: 263μ (ε=7550). Rf in System I=0.68.

The compound is active for instance against *Proteus vulgaris*.

The desacetyl-7-(chloro-tertiary butylureido)-cephalosporanic acid used as starting material may be prepared by reacting 7-amino-cephalosporanic acid with chloro-tertiary butylisocyanate and by enzymatic desacetyl-action by the process described in Example 2. Behaviour in the thin-layer chromatogram (on silica gel, iodine starch+ acetic acid reagent): System I: Rf=0.42; System II: Rf=0.34; System III: Rf=0.56.

EXAMPLE 6

100 mg. of absolute triethylamine and 100 mg. of ethyl isocyanate are added to 112 mg. of desacetyl-7-amino-cephalosporanic acid in 9 ml. of absolute dimethylformamide and the whole maintained at 50° C. for 2 hours with the exclusion of moisture. At the beginning of the reaction the batch is agitated occasionally until the undissolved material is dissolved. When the reaction is complete, the solution is evaporated to dryness of 30° C. in a high vacuum in a rotary evaporator. The residue is treated with 0.5 N aqueous potassium bicarbonate solution and extracted several times with ethyl acetate. After acidifying the extracted aqueous phase with hydrochloric acid to pH 3, it is extracted exhaustively with ethyl acetate, the combined ethyl acetate extracts are washed with water and saturated sodium chloride solution, dried with sodium sulfate and evaporated to dryness. The almost colorless residue contains O-desacetyl-O-ethylcarbamoyl-7-ethylureido-cephalosporanic acid.

In the infrared spectrum in Nujol it displays characteristic bands at 5.6; 5.9 and 6.1μ. The substance shows in vitro a high antibacterial activity towards gram negative bacteria, for instance *Escherichia coli*, *Salmonella typhosa* and *Klebsiella pneumoniae*.

EXAMPLE 7

300 mg. (0.65 millimol) of the triethylammonium salt of crude desacetyl-7-(chloro-tertiary butyl-ureido)-cephalosporanic acid (about 60% strength) are taken up in 3 ml. of freshly degassed dimethyl-formamide, 2.4 ml. of a 10% solution of absolute tributylamine (1.3 millimols) in dimethylformamide and 1.35 ml. of a 10% solution of β-chloroethyl-isocyanate (1.3 millimols) in dimethylformamide and allowed to react for 2 hours at 20° C. During the whole reaction time the batch is subjected to ultrasonics of the frequency 45 kilocycles per second. The batch is then evaporated to dryness in vacuo, dissolved in a mixture of ethyl acetate+0.1 molar phosphate buffer pH 7 (1:1) and acidified with concentrated phosphoric acid to pH 2.0. After being stirred for half an hour at 20° C., the mixture is adjusted to pH 8.0 with aqueous tripotassium phosphate solution of 50% strength and washed with ethyl acetate. The aqueous phase is adjusted to pH 2.0 with concentrated hydrochloric acid and the product extracted with ethyl acetate. The extract dried over sodium sulfate is evaporated in vacuo to yield 140 mg. of desacetyl-O-(β-chloroethylcarbamoyl)-7-(chloro - tertiary butylureido)-cephalosporanic acid.

The Rf value in the thin-layer chromatogram in System I is 0.47; in System III 0.55.

EXAMPLE 8

300 mg. (0.65 millimol) of the crude triethyl-ammonium salt of desacetyl-7-(chloro-tertiary butylureido)-cephalosporanic acid are reacted as described in Example 7 (2 hours) with 1.3 millimols of chloromethylisocyanate to yield 75 mg. of desacetyl-O-chloromethyl-carbamoyl-7-(chloro-tertiary butylureido)-cephalosporanic acid. The Rf-value in System I is 0.61; in System III 0.79.

EXAMPLE 9

When 300 mg. (0.65 millimol) of the crude triethylammonium salt of desacetyl-7-(chloro-tertiary butylureido)-cephalosporanic acid are reacted as described in Example 7 for 16 hours with 1.3 millimols of ethylisocyanate, there are obtained 99 mg. of desacetyl-O-ethylcarbamoyl-7-(chloro-tertiary butylureido) - cephalosporanic acid. The Rf-value in System I is 0.40; in System III 0.55.

EXAMPLE 10

300 mg. (0.65 millimol) of the crude triethylammonium salt of desacetyl-7-(chloro-tertiary butylureido)-cephalosporanic acid are reacted as described in Example 7 for 16 hours with 1.3 millimols of methylisocyanate to yield 89 mg. of desacetyl-O-methylcarbamoyl-7-(chlorotertiary butylureido)-cephalosporanic acid. The Rf-value in System I is 0.42; in System III 0.54.

EXAMPLE 11

300 mg. (0.69 millimol) of the triethyl-ammonium salt from about 60% desacetyl-7-(β-chloro-ethylureido)-cephalosporanic acid are reacted as described in Example 7 in 3 ml. of dimethylformamide and 2.55 ml. of tributylamine of 10% strength in dimethylformamide (1.37 millimols) with 0.97 ml. of ethylisocyanate of 10% strength in dimethylformamide (1.37 millimols) for 16 hours, and then worked up. 81 mg. of desacetyl-O-ethylcarbamoyl - 7 - (β - chloroethylureido) - cephalosporanic acid are obtained.

The Rf-value in System I is 0.35; in System III 0.54.

EXAMPLE 12

300 mg. (0.60 millimol) of the crude triethylammonium salt of desacetyl-7-(β-chloro-ethylureido)-cephalosporanic acid are reacted as described in Example 11 with 1.37 millimols of methylisocyanate for 16 hours to yield 80 mg. of desacetyl-O-methylcarbamoyl-7-(β-chloroethylureido)-cephalosporanic acid.

The Rf-value in System I is 0.31; in System III 0.54.

EXAMPLE 13

A 20% aqueous solution with a pH of 7.0 of the sodium salt of O-desacetyl-O-(β-chlorethyl-carbamoyl)-7-(β-chlorethyl-uredio)-cephalosporanic acid (cf. Example 1) is prepared. The solution is filtered and placed into vials of 10 ml. capacity (5 ml. in each), then lyophilized. Adddition of distilled water or physiological sodium chloride solution yields an injectable solution containing 1 g. of the active compound per dosis.

What is claimed is:

1. A process for the manufacture of new derivatives of 7-amino-cephalosporanic acid of the Formula I

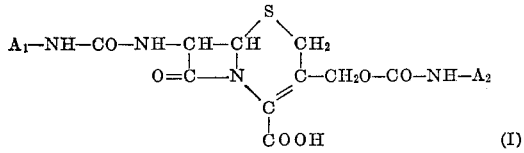

in which A₁ and A₂ each represents a member selected from the group consisting of unsubstituted aliphatic hydrocarbon, halo-substituted aliphatic hydrocarbon and lower alkoxy-substituted aliphatic hydrocarbon, each of said hydrocarbon substituents having 1 to 6 carbon atoms wherein a desacetyl-7-amino-cephalosporanic acid of the Formula II

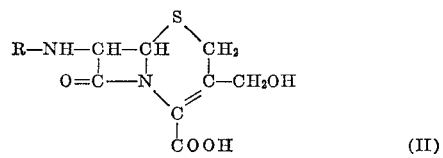

in which R stands for a member selected from the group consisting of hydrogen and the group CO—NH—A₁, is reacted, at a temperature up to about 50° C., with an isocyanic acid ester of the Formula III $$A_2—N=C=O \quad (III)$$

2. A process as claimed in claim 1, wherein $A_1$ and $A_2$ each represents an alkyl group which contains at most 6 carbon atoms and is substituted by at least one halogen atom.

3. A process as claimed in claim 1, wherein the desacetyl compound is reacted with the isocyanate in the presence of a strong organic nitrogen base.

4. A process as claimed in claim 1, wherein the reaction is carried out in an inert organic solvent.

5. A process as claimed in claim 4, wherein the reaction is carried out in dimethylformamide.

6. A compound of the Formula I

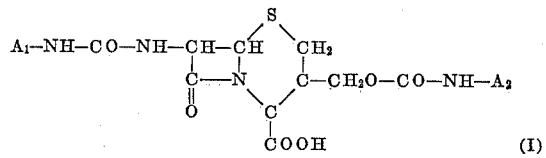

in which $A_1$ and $A_2$ each represents a lower alkyl radical substituted by at least one halogen atom, said lower alkyl radical having at most 6 carbon atoms.

7. A compound of the Formula I

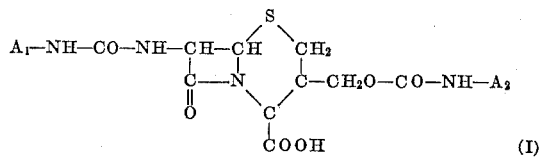

in which $A_1$ and $A_2$ each represents a lower alkyl radical which has at most four carbon atoms and is substituted by halogen in β-position to the isocyanato group.

8. A compound of the Formula I

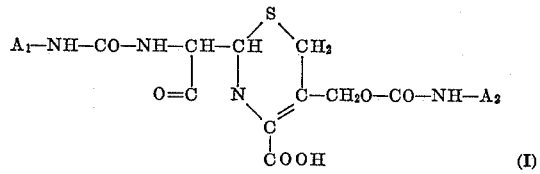

in which $A_1$ and $A_2$ each represents an alkyl radical with at most 6 carbon atoms substituted by chlorine.

9. O - desacetyl - O - (β - chloroethylcarbamoyl) - 7-(β-chloroethylureido)-cephalosporanic acid.

10. A therapeutically useful metal salt of the compond claimed in claim 16, said metal being a member selected from the group consisting of alkali metals and alkaline earth metals.

11. A therapeutically useful metal salt of the compound claimed in claim 6, said metal being a member selected from the group consisting of alkali metals and alkaline earth metals.

12. A therapeutically useful salt of the compound claimed in claim 16 with an organic nitrogen base.

13. A therapeutically useful salt of the compound claimed in claim 6 with an organic nitrogen base.

14. A benzhydryl ester of a compound as claimed in claim 16.

15. A benzhydryl ester of a compound as claimed in claim 6.

16. A compound of the Formula I

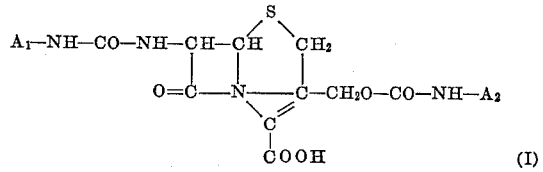

in which $A_1$ and $A_2$ each represents a member selected from the group consisting of lower alkyl, lower alkenyl and said lower alkyl and alkenyl substituted by at least one halogen atom and said lower alkyl and alkenyl substituted by lower alkoxy.

References Cited

UNITED STATES PATENTS

| | | |
|---|---|---|
| 3,173,916 | 3/1965 | Shull et al. |
| 3,202,656 | 8/1965 | Abraham et al. |
| 3,234,224 | 2/1966 | Schenker et al. |

OTHER REFERENCES

Degering: An Outline of Organic Nitrogen Compounds, p. 532 (1950).

NICHOLAS S. RIZZO, Primary Examiner

U.S. Cl. X.R.

424—246

CASE 5368/1-3/E

PO-1050
(5/69)

UNITED STATES PATENT OFFICE
CERTIFICATE OF CORRECTION

Patent No. 3,484,437      Dated December 16, 1969

Inventor(s) JAKOB URECH ET AL

It is certified that error appears in the above-identified patent and that said Letters Patent are hereby corrected as shown below:

Column 9, line 20, delete formula and insert ---

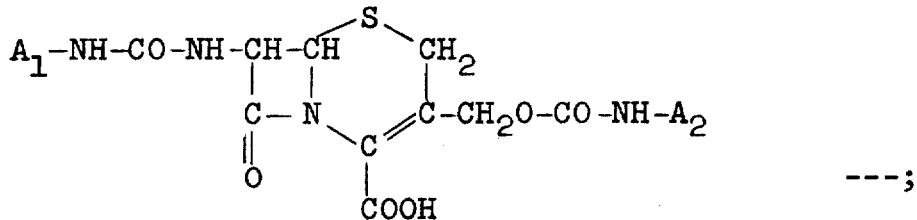

---;

Column 9, line 30, delete formula and insert ---

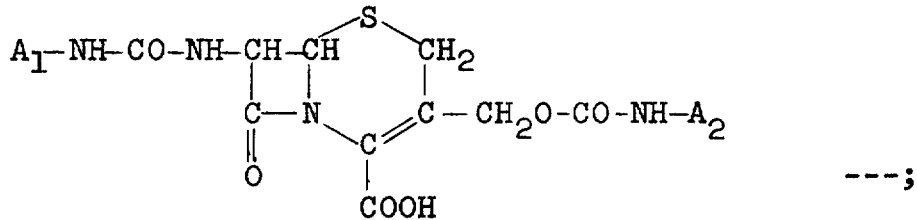

---;

Column 9, line 42, delete formula and insert ---

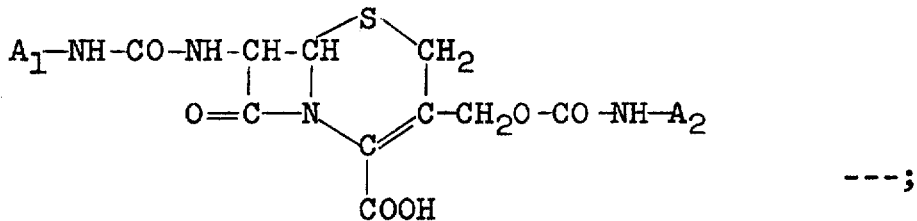

---;

Column 10, line 4, delete "pond" and insert --- pound ---;

Column 10, line 24, delete formula and insert ---

UNITED STATES PATENT OFFICE
CERTIFICATE OF CORRECTION

Patent No. 3,484,437      Dated December 16, 1969

Inventor(s) JAKOB URECH ET AL

It is certified that error appears in the above-identified patent and that said Letters Patent are hereby corrected as shown below:

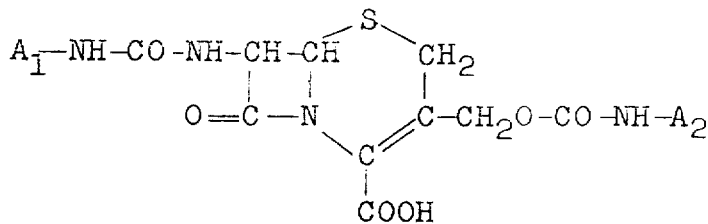

SIGNED AND SEALED

March 9, 1971

(SEAL)
Attest:

Edward M. Fletcher, Jr.
Attesting Officer

WILLIAM E. SCHUYLER, JR.
Commissioner of Patents